J. J. R. MEYER.
WIRE CUTTER FOR RIFLES.
APPLICATION FILED NOV. 6, 1918.

1,333,556.  Patented Mar. 9, 1920.

Inventor
J. J. R. Meyer.
By
Attorney

UNITED STATES PATENT OFFICE.

JOHN J. R. MEYER, OF LAKE, WISCONSIN.

WIRE-CUTTER FOR RIFLES.

1,333,556.  Specification of Letters Patent.  Patented Mar. 9, 1920.

Application filed November 6, 1918. Serial No. 261,394.

*To all whom it may concern:*

Be it known that I, JOHN J. R. MEYER, a citizen of the United States, residing at Lake, in the county of Milwaukee and State of Wisconsin, have invented certain new and useful Improvements in Wire-Cutters for Rifles; and I do hereby declare the following to be a full, clear, and exact description of the invention, such as will enable others skilled in the art to which it appertains to make and use the same.

This invention relates to improvements in wire cutters for rifles and similar fire-arms and has for one of its objects the provision of a cutting means that can be conveniently attached to the rifles so that wire entanglements and the like can be readily severed, so rendering the device especially adaptable for military purposes when attacking fortified positions.

Another object of this invention is the provision of novel means for attaching the cutting means to the fire-arms or rifles and which permit of reversing or adjusting of the cutting means so that another cutting edge can be presented when one edge becomes dull or broken.

A further object of this invention is the provision of a wire cutter of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1:
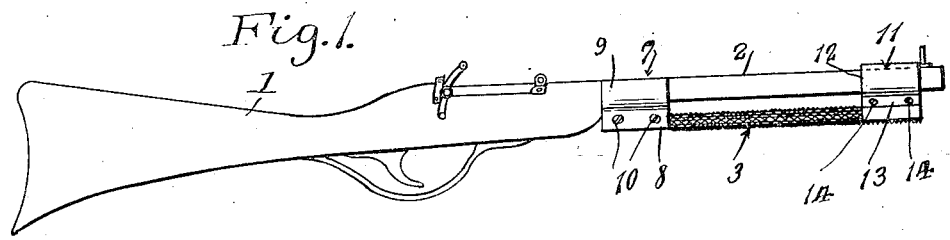
Figure 2:
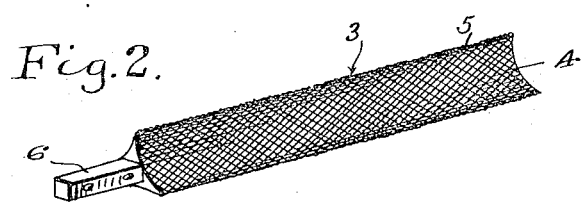
Figure 3:
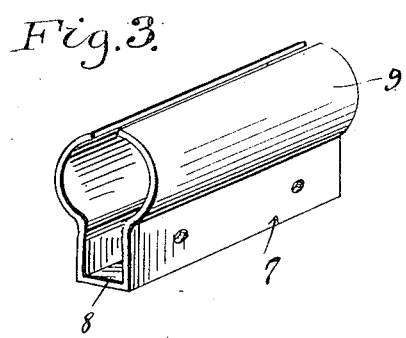
Figure 4:
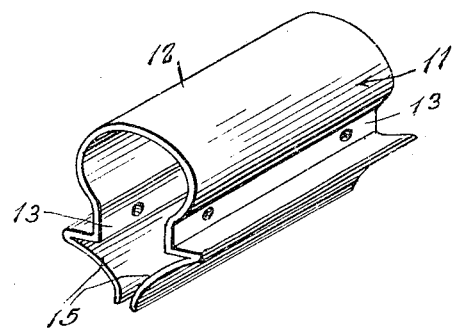
Figure 5:
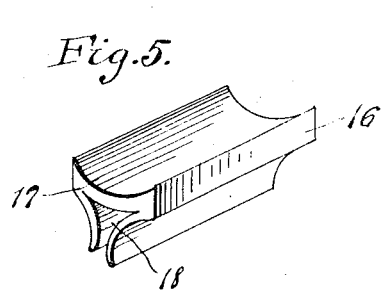
Figure 6:
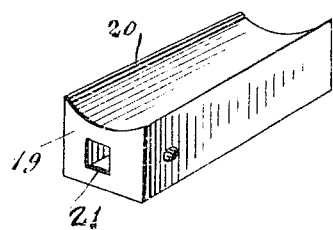

Figure 1 is a side elevation of a rifle illustrating my invention applied thereto, Fig. 2 is a perspective view of the cutting element, Fig. 3 is a perspective view of a rear clamp, Fig. 4 is a similar view of a front clamp, Fig. 5 is a perspective view of a modified form of front clamp, and Fig. 6 is a perspective view of a modified form of rear clamp.

Referring in detail to the drawing, the numeral 1 indicates as an entirety a rifle having the usual barrel 2, to which my invention is applied.

A cutting element 3 is of substantially triangular shape in cross section and has its faces 4 concaved or hollow ground to present sharp cutting edges 5. The faces 4 have formed thereon file or cutting ribs that extend over the edges 5 so that wire and like objects can be readily severed by drawing any one of the edges 5 forwardly and rearwardly thereon.

A substantially rectangular shank 6 is formed upon one end of the cutting element 3 and is adapted to be received by a rear clip 7 that consists of a substantially rectangular portion 8 having formed upon its upper edges arcuate shaped clamping members 9 that receive the barrel 2 of the gun 1. The clamping members 9 are caused to grip the barrel 2 by retaining bolts 10 extending through the rectangular portion 8 of the clamp 7. The shank 6 of the cutting element may be provided with openings to receive the retaining bolts 10 for further securing the cutting element to the rear clamp.

A front clamp 11 consists of a substantially U-shaped gripping portion 12 that receives the forward end of the barrel 2 of the gun 1 and has formed upon its edges straight parallel portions 13 which are provided with openings to receive retaining bolts 14 that cause the gripping member 12 to tightly clamp the barrel 2 of the gun.

Substantially V-shaped members 15 have the ends of one of their arms formed upon the portions 13, while their inner faces are adapted to receive a pair of the faces 5 of the cutting element 3 whereby the forward end of the cutting element is secured to the forward end of the barrel 2 of the gun. The members 15 are caused to grip the cutting element 3 by the retaining bolts 14 and are of sufficient width to expose one of the edges 5 of the cutting element 3 so that the same can be readily drawn across a wire or the like for the purpose of severing the same.

Referring to my modified form of invention as disclosed in Figs. 5 and 6, the front clamp consists of a body 16 having a concaved top face 17 adapted to be formed on the barrel 2 when constructing the same and is provided with the gripping portions 18 to receive the forward end of the cutting element 3. The rear clamp consists of a body 19 having a concaved top face 20 adapted to be formed or cast with the barrel 2 and is provided with the usual rectangular portion 21 for receiving the shank 6 of the cutting element 3.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A wire cutter comprising a triangular shaped cutting element in cross section having its faces concaved and serrated, said serrations extending across the edges of said cutting element, a rectangular shank formed upon one end of said cutting element, a clamp receiving the shank and the barrel of a gun, and a second clamp receiving one end of the cutting element and the barrel of the gun.

2. A wire cutter comprising front and rear clamps, said rear clamp including a rectangular portion, arcuate shaped clamping members formed upon said rectangular portion and receiving the barrel of a gun, a cutting element, a rectangular shank formed upon one end of the cutting element and received within the rectangular portion of the rear clamp, retaining bolts extending through the rectangular portion of said clamp and the shank for causing the arcuate shaped members to grip the barrel of the gun, said front clamp including a substantially U-shaped gripping portion to receive the barrel of a gun, parallel spaced portions formed upon the edges of the substantially U-shaped portion, and V-shaped gripping portions formed on the edges at their ends of the straight portions and engaging the faces of the cutting element.

In testimony whereof I affix my signature in presence of two witnesses.

JOHN J. R. MEYER.

Witnesses:
 FRED MEYER,
 JOHN SCHULTZ.

J. D. PEDERSEN.
FIREARM.
APPLICATION FILED NOV. 27, 1917. RENEWED JULY 31, 1919.
1,333,570.
Patented Mar. 9, 1920.
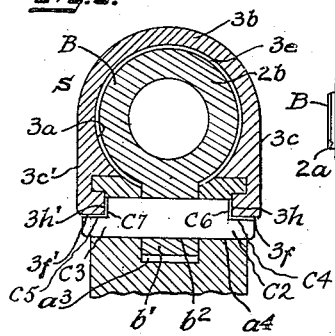
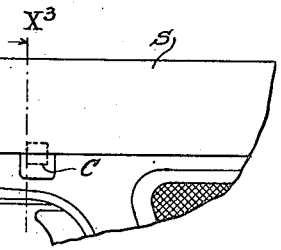
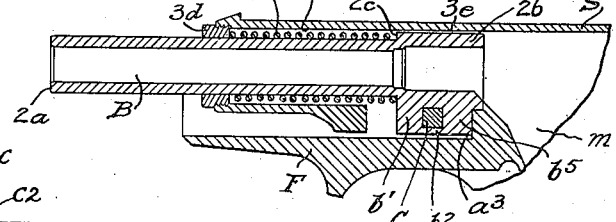
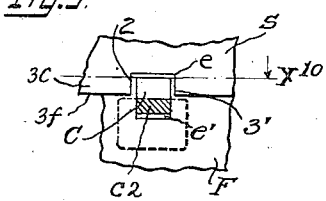
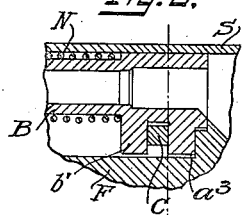
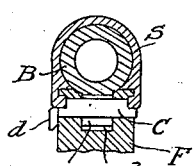
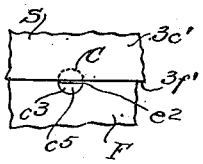
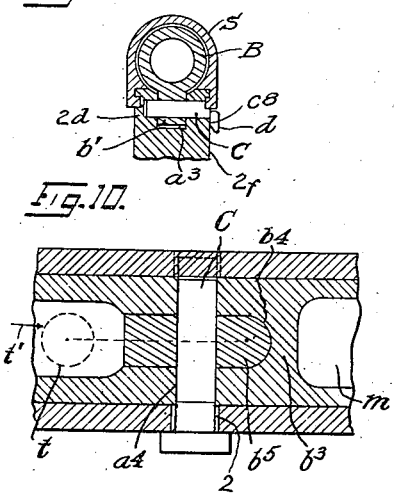
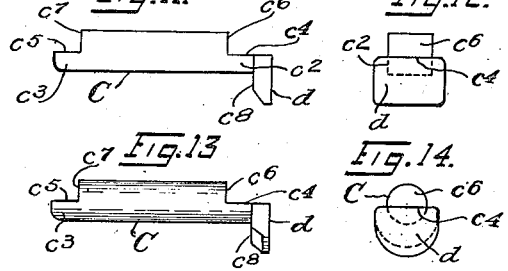
Inventor:
John D. Pedersen,
By his Atty, F. H. Richards.